United States Patent
Hedman et al.

(10) Patent No.: US 12,196,296 B2
(45) Date of Patent: Jan. 14, 2025

(54) POWERTRAIN FOR A VEHICLE

(71) Applicant: VOLVO TRUCK CORPORATION, Gothenburg (SE)

(72) Inventors: Anders Hedman, Marstrand (SE); Andrius Charitonovas, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/587,357

(22) Filed: Feb. 26, 2024

(65) Prior Publication Data
US 2024/0295258 A1    Sep. 5, 2024

(30) Foreign Application Priority Data

Mar. 3, 2023  (EP) ...................................... 23159955

(51) Int. Cl.
*F16H 37/08* (2006.01)
*B60K 17/08* (2006.01)
(Continued)

(52) U.S. Cl.
CPC ............ *F16H 37/082* (2013.01); *B60K 17/08* (2013.01); *B60K 17/16* (2013.01); *F16H 57/032* (2013.01); *F16H 57/037* (2013.01); *F16H 57/045* (2013.01); *F16H 57/0483* (2013.01); *F16H 57/0484* (2013.01); *F16H 2057/02052* (2013.01); *F16H 2200/0034* (2013.01)

(58) Field of Classification Search
CPC ........... F16H 57/045; F16H 2200/0034; F16H 57/037; B60K 17/16
See application file for complete search history.

(56) References Cited

U.S. PATENT DOCUMENTS 10,502,261 B2 * 12/2019 Kato ...................... F16C 35/042
12,000,463 B2 *  6/2024 Barillot .................... B60K 1/02
(Continued)

FOREIGN PATENT DOCUMENTS

CN       110185763 A  *  8/2019  ........... B60K 17/344
DE         2420232 A1     11/1975
(Continued)

OTHER PUBLICATIONS

Extended European Search Report, European Patent Application No. 23159955.6, mailed Jul. 13, 2023, 8 pages.

*Primary Examiner* — Derek D Knight
(74) *Attorney, Agent, or Firm* — Sage Patent Group (57) ABSTRACT

The disclosure relates to a powertrain for a vehicle, comprising:
a transmission and a differential gear which are drivingly connected to each other, wherein the differential gear is configured to be drivingly connected to driving wheels of the vehicle;
wherein the transmission comprises a first set of gearwheels and a second set of gearwheels, at least one gearwheel of the first set of gearwheels being drivingly connected to at least one gearwheel of the second set of gearwheels via at least a first shaft which is configured to rotate about a first rotational axis,
wherein the first set of gearwheels is arranged on a first side of the differential gear and the second set of gearwheels is arranged on a second opposite side of the differential gear. The disclosure also relates to a vehicle.

16 Claims, 4 Drawing Sheets

(51) Int. Cl.
*B60K 17/16* (2006.01)
*F16H 57/032* (2012.01)
*F16H 57/037* (2012.01)
*F16H 57/04* (2010.01)
*F16H 57/02* (2012.01)

(56) References Cited

U.S. PATENT DOCUMENTS

| | | | | |
|---|---|---|---|---|
| 2013/0184111 A1* | 7/2013 | Tsuchida | ............... | B60K 6/405 |
| | | | | 475/5 |
| 2013/0305878 A1* | 11/2013 | Seno | ................... | F16H 57/0482 |
| | | | | 74/665 A |
| 2021/0039487 A1* | 2/2021 | Engerman | ............... | F16D 25/10 |

FOREIGN PATENT DOCUMENTS

| EP | 3305573 A1 | 4/2018 |
|---|---|---|
| WO | 2019152065 A1 | 8/2019 |

\* cited by examiner

|          | 1 | 2 | 3 | 4 |
|----------|---|---|---|---|
| 1st gear |   | X | X |   |
| 2nd gear |   | X |   | X |
| 3rd gear | X |   | X |   |
| 4th gear | X | X |   |   |

Fig. 6

POWERTRAIN FOR A VEHICLE

CROSS REFERENCE TO RELATED APPLICATIONS

This application claims foreign priority to European Patent Application No. 23159955.6, filed on Mar. 3, 2023, the disclosure and content of which is incorporated by reference herein in its entirety.

TECHNICAL FIELD

The disclosure relates generally to powertrains. In particular aspects, the disclosure relates to a powertrain for a vehicle and to a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A powertrain for a vehicle may comprise a transmission and a differential gear which are drivingly connected to each other. The differential gear is configured to be drivingly connected to driving wheels of the vehicle. The transmission may be configured to be drivingly connected to a power source, such as an internal combustion engine and/or one or more electric motors for powering the driving wheels. There are numerous types of transmissions for transferring torque from a power source to driving wheels. In view of recent technology trends for vehicles, in particular in view of the electrification trend, there is a strive to develop improved technology for vehicle powertrains.

SUMMARY

According to a first aspect of the disclosure, there is provided a powertrain for a vehicle, comprising:
 a transmission and a differential gear which are drivingly connected to each other, wherein the differential gear is configured to be drivingly connected to driving wheels of the vehicle; wherein the transmission comprises a first set of gearwheels and a second set of gearwheels, at least one gearwheel of the first set of gearwheels being drivingly connected to at least one gearwheel of the second set of gearwheels via at least a first shaft which is configured to rotate about a first rotational axis,
wherein the first set of gearwheels is arranged on a first side of the differential gear and the second set of gearwheels is arranged on a second opposite side of the differential gear, as seen with respect to a first geometric sectional plane, which is perpendicular to the first rotational axis and which extends through the differential gear,
wherein the transmission further comprises a first lubricant compartment for the first and second set of gearwheels, the first lubricant compartment being formed by a first transmission housing for the first set of gearwheels and a second transmission housing for the second set of gearwheels, the first and second transmission housings being fluidly connected by a connecting interface,
wherein the at least first shaft extends through the connecting interface and wherein the connecting interface defines an inner perimeter profile of the first lubricant compartment which encloses the at least first shaft, and
wherein the inner perimeter profile is eccentric with respect to the first rotational axis, as seen in a second geometric sectional plane which extends through the connecting interface and which is perpendicular to the first rotational axis.

The first aspect of the disclosure may seek to provide an efficient, reliable and/or compact powertrain. A technical benefit may include that the powertrain may be efficiently packaged in the vehicle while still allowing lubricant to flow efficiently between the two transmission housings of the first lubricant compartment. For example, it has been realized that by providing an eccentric configuration as disclosed herein, unwanted power losses and/or sedimentation of particles in the lubricant may be avoided.

In some examples, including in at least one preferred example, optionally, the second geometric sectional plane extends in a vertical direction of the powertrain, and the inner perimeter profile encloses an area, as seen in the second geometric sectional plane, wherein the eccentricity is formed such that a first portion of the area, which in the vertical direction is below the first rotational axis, is larger than a second portion of the area, which in the vertical direction is above the first rotational axis. A technical benefit may include that lubricant will more easily be allowed to flow between the first and second transmission housings, thereby mitigating the risk of lubricant getting stuck in a pocket of the first lubricant compartment. The vertical direction of the powertrain as disclosed herein may correspond to a vertical direction of the vehicle when the powertrain is provided in the vehicle. For example, the vertical direction(s) may coincide with a gravitational direction when the powertrain and/or vehicle is provided on a flat horizontally extending surface.

In some examples, including in at least one preferred example, optionally, the powertrain extends in a vertical direction which is perpendicular to the first rotational axis, wherein the first set of gearwheels is having a lowest point in the vertical direction, and wherein the inner perimeter profile of the connecting interface is having a lowest point in the vertical direction, wherein the first lubricant compartment comprises an inner bottom wall surface which is formed such that the inner bottom wall surface extends along an axis, preferably wherein the axis is parallel with the first rotational axis, from a point below the lowest point of the first set of gearwheels to the lowest point of the inner perimeter profile. A technical benefit may include a reduced risk of lubricant getting stuck in a pocket of the first lubricant compartment, thereby allowing lubricant to more easily flow therein.

In some examples, including in at least one preferred example, optionally, the inner perimeter profile is circular or oval, as seen in the second geometric sectional plane. A circular or oval inner perimeter profile implies reduced risk of lubricant leakage at the connecting interface. In some examples, the connecting interface may comprise a sealing element, such as a ring-formed sealing element, for example made of a polymer, such as rubber.

In some examples, including in at least one preferred example, optionally, the first set of gearwheels is a planetary gearset. It has been realized that an eccentric configuration as disclosed herein may be beneficial for a planetary gearset, e.g., reducing the risk of lubricant getting stuck at a bottom section of the planetary gearset.

In some examples, including in at least one preferred example, optionally, at least one gearwheel of the first set of gearwheels is further drivingly connected to at least one gearwheel of the second set of gearwheels via a second shaft which is configured to rotate about a second rotational axis, wherein the second shaft extends through the connecting interface. A technical benefit may include that torque can be transferred from the first set of gearwheels to the second set of gearwheels in more ways, such as by providing a torque split in which torque is transferred simultaneously in two separate torque paths from an input shaft to an output shaft of the transmission.

In some examples, including in at least one preferred example, optionally, the second shaft is concentric with the first shaft. A technical benefit may include that a more compact transmission may be provided. In some examples, including in at least one preferred example, optionally, the first and second concentric shafts are the only shafts configured to transfer torque from the first set of gearwheels to the second set of gearwheels.

In some examples, including in at least one preferred example, optionally, the second rotational axis is parallel with the first rotational axis. A technical benefit may include that more alternative configurations of the first and second set of gearwheels may be provided.

In some examples, including in at least one preferred example, optionally, the powertrain further comprises a second lubricant compartment for the differential gear, the second lubricant compartment being formed by a differential gear housing. A technical benefit may include that different types of lubricants may be allowed to be used in the first and second lubricant compartments. Another technical benefit may include that debris generated from the transmission may not be transferred to the differential gear, and debris generated from the differential gear may not be transferred to the transmission.

In some examples, including in at least one preferred example, optionally, at least one of the first and second transmission housings is a separate element with respect to the differential gear housing. A technical benefit may include facilitated manufacturing, e.g., by modularization, implying a cost-effective configuration.

In some examples, including in at least one preferred example, optionally, at least one of the first and second transmission housings is part of the differential gear housing, such as made in one single piece of cast material. A technical benefit may include facilitated manufacturing, e.g., by casting fewer parts, implying a cost-effective configuration.

In some examples, including in at least one preferred example, optionally, the powertrain extends in a vertical direction which is perpendicular to the first rotational axis, and the connecting interface is at least partly provided below a center point of the differential gear, as seen in the vertical direction. A technical benefit may include an improved packaging of the powertrain when the powertrain is provided in a vehicle. A center point may be defined as a geometric center of the differential gear, typically intersected by a rotational axis for transferring torque from the differential gear to the driving wheels.

In some examples, including in at least one preferred example, optionally, the transmission further comprises an input shaft drivingly connected to at least one gearwheel of the first set of gearwheels and an output shaft configured to drivingly connect at least one gearwheel of the second set of gearwheels to the differential gear, wherein the transmission is configured to selectively provide at least two different input/output speed ratios with respect to the input shaft and the output shaft, and wherein the transmission is further configured such that at least one of the at least two different input/output speed ratios is achieved by simultaneously providing two separate torque paths from the input shaft to the output shaft. A technical benefit may include that forces exerted on gearwheels may be reduced compared to forces exerted on gearwheels if only one torque path was used.

In some examples, including in at least one preferred example, optionally, the transmission further comprises at least one gear engaging device which is configured to provide at least two selectable gear connections, wherein the at least one gear engaging device is located in the second transmission housing. A technical benefit of providing the at least one gear engaging device in the second transmission housing is that a more compact and less complicated first transmission housing may be achieved.

In some examples, including in at least one preferred example, optionally, the powertrain further comprises at least one power unit configured to provide propulsion power to the driving wheels of the vehicle. The power unit may for example be an electric motor. Additionally, or alternatively, the power unit may be an internal combustion engine.

According to a second aspect of the disclosure, a vehicle comprising the powertrain according to any example of the first aspect of the disclosure is provided. Advantages, effects and benefits of the second aspect of the disclosure are analogous to the advantages, effects and benefits of the first aspect of the disclosure. It shall also be noted that all examples of the first aspect of the disclosure are applicable to all examples of the second aspect of the disclosure, and vice versa.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

The drawings show diagrammatic exemplifying embodiments of the present disclosure and are thus not necessarily drawn to scale. It shall be noted that some details in the drawings may be exaggerated in order to better describe and illustrate the particular example. Like reference characters refer to like elements throughout the description, unless expressed otherwise.

DETAILED DESCRIPTION

The detailed description set forth below provides information and examples of the disclosed technology with sufficient detail to enable those skilled in the art to practice the disclosure.

The present disclosure is based on an aim to provide an improved powertrain for a vehicle which achieves at least one of the following: 1) it solves conflicting requirements of packaging and performance, 2) it is cost-effective, and 3) it enables a high degree of commonality between electric powertrains of different power levels and/or with different types of installations in vehicles. A technical benefit of the disclosure may include that the powertrain may be efficiently packaged in the vehicle while still allowing lubricant to flow efficiently between the two transmission housings of the first lubricant compartment. For example, it has been realized that by providing an eccentric configuration as disclosed herein, unwanted power losses and/or sedimentation of particles in the lubricant may be avoided. In view of the above, an aim of the present disclosure is to provide an improved powertrain for a vehicle, and/or a vehicle, which alleviates at least one of the drawbacks of the prior art, or which at least provides a suitable alternative.

Figure 1:
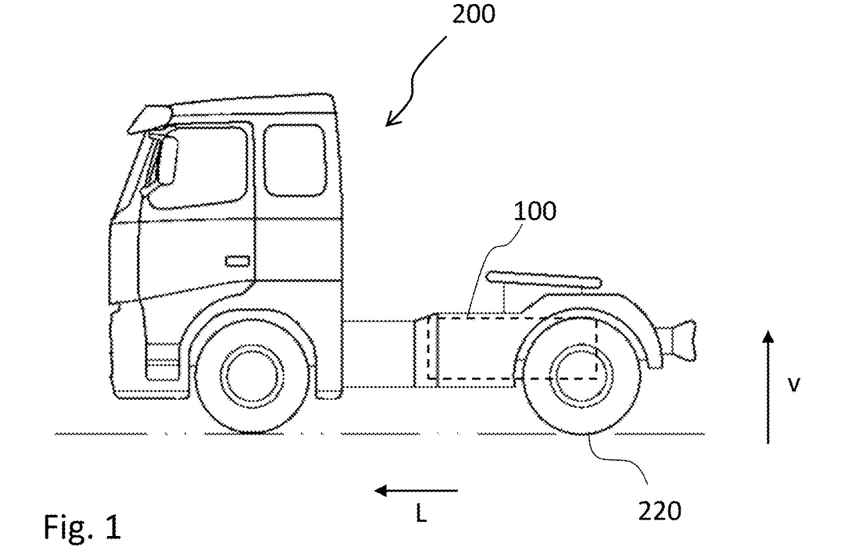
FIG. 1 is an exemplary vehicle according to an example of the disclosure.

FIG. 1 is a side view of an exemplary vehicle 200 according to an example of the second aspect of the disclosure. The vehicle 200 is here a heavy-duty truck, more specifically a towing truck, or tractor, for pulling one or more trailers (not shown). It shall be noted that the vehicle according to the disclosure may be any other type of vehicle, such as a bus, construction equipment, e.g., a wheel loader, a dump truck, and a passenger car. The vehicle 200 extends in a longitudinal direction L which corresponds to a travel direction of the vehicle 200, i.e., a forward or rearward travel direction. The vehicle 200 also extends in a vertical direction v. The vertical direction v is directed in an opposite direction to a gravitational direction when the vehicle 200 is provided on a flat horizontally extending surface. The vertical direction v is perpendicular to the longitudinal direction L. The vehicle comprises a powertrain 100 according to examples of the present disclosure. The powertrain 100 is drivingly connected to driving wheels 220 of the vehicle 200, in the shown example rear wheels of the heavy-duty truck. The vehicle 200 may for example be a fully electric vehicle, a hybrid vehicle, or a traditional vehicle powered by an internal combustion engine.

Figure 2:
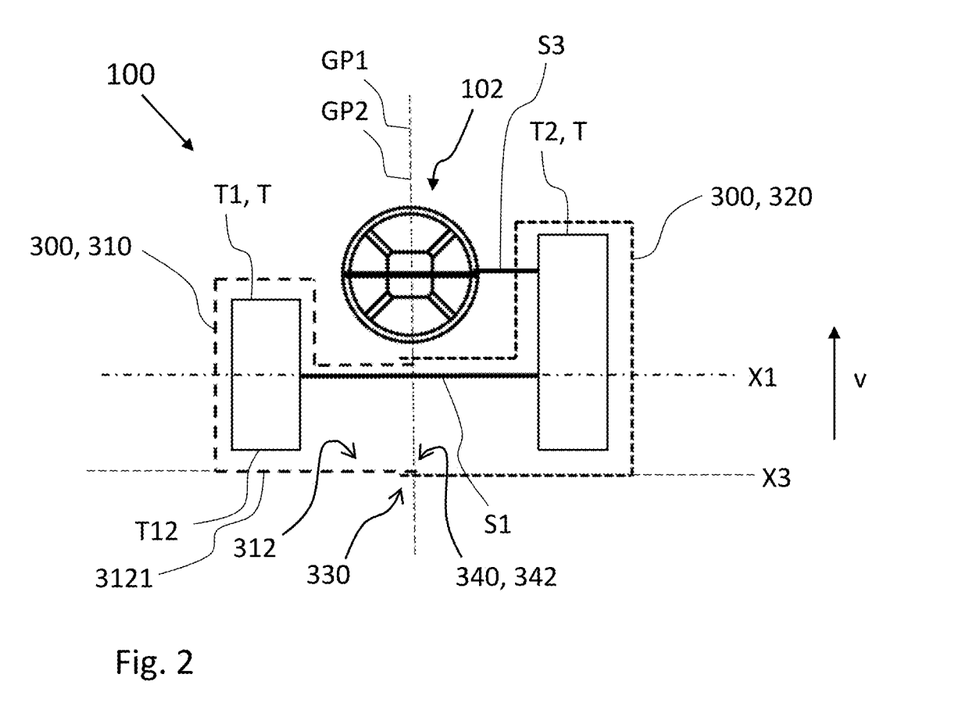
FIG. 2 is a schematic view of an exemplary powertrain according to an example of the disclosure.

FIG. 2 depicts an exemplary powertrain 100 according to an example of the first aspect of the disclosure. The powertrain 100 may for example be the powertrain 100 as shown in FIG. 1.

The powertrain 100 comprises:
  a transmission T and a differential gear 102 which are drivingly connected to each other, wherein the differential gear 102 is configured to be drivingly connected to driving wheels 220 of the vehicle 200.

The transmission T comprises a first set of gearwheels T1 and a second set of gearwheels T2. In the shown example, the first and second sets of gearwheels T1, T2 are schematically depicted by boxes. At least one gearwheel (not shown) of the first set of gearwheels T1 is drivingly connected to at least one gearwheel (not shown) of the second set of gearwheels T2 via at least a first shaft S1 which is configured to rotate about a first rotational axis X1. A direction of the first rotational axis X1 may for example correspond to the longitudinal direction L as depicted in FIG. 1 when the powertrain 100 is mounted in the vehicle 200. The first rotational axis X1 may also as shown be perpendicular to a vertical direction v of the powertrain 100. The second set of gearwheels T2 is drivingly connected to the differential gear 102 via a third shaft S3. The third shaft S3 may as shown be arranged in parallel with the first shaft S1.

The first set of gearwheels T1 is arranged on a first side of the differential gear 102 and the second set of gearwheels T2 is arranged on a second opposite side of the differential gear 102, as seen with respect to a first geometric sectional plane GP1, which is perpendicular to the first rotational axis X1 and which extends through the differential gear 102.

The transmission T further comprises a first lubricant compartment 300 for the first and second set of gearwheels T1, T2. The first lubricant compartment 300 is formed by a first transmission housing 310 for the first set of gearwheels T1 and a second transmission housing 320 for the second set of gearwheels T2. The first and second transmission housings 310, 320 are fluidly connected by a connecting interface 330. A lubricant compartment as disclosed herein means a reservoir for containing lubricant, e.g., a reservoir for containing oil.

The at least first shaft S1 extends through the connecting interface 330 and the connecting interface 330 defines an inner perimeter profile 340 of the first lubricant compartment 300 which encloses the at least first shaft S1. In addition, the inner perimeter profile 340 is eccentric with respect to the first rotational axis X1, as seen in a second geometric sectional plane GP2 which extends through the connecting interface 330 and which is perpendicular to the first rotational axis X1. In the shown example, the first and second geometric sectional planes GP1, GP2, coincide. It shall however be noted that the geometric sectional planes GP1, GP2 may not necessarily coincide, but may alternatively be provided with an offset from each other.

Figure 3A:
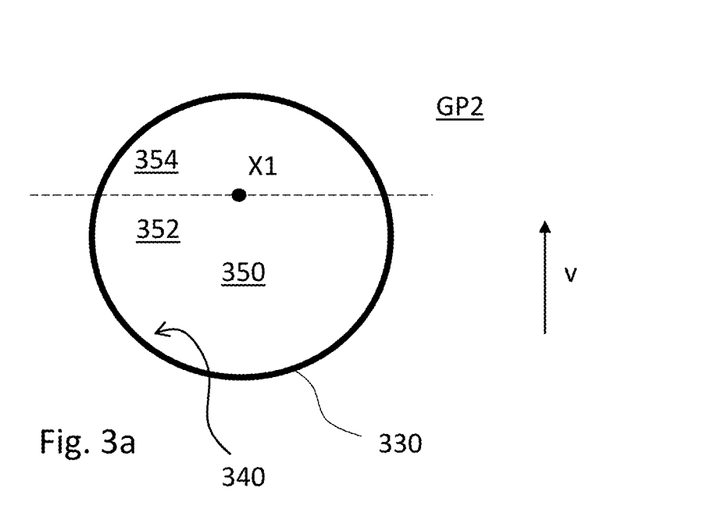
FIGS. 3a-b are schematic sectional views of exemplary connecting interfaces according to examples of the disclosure.
Figure 3B:
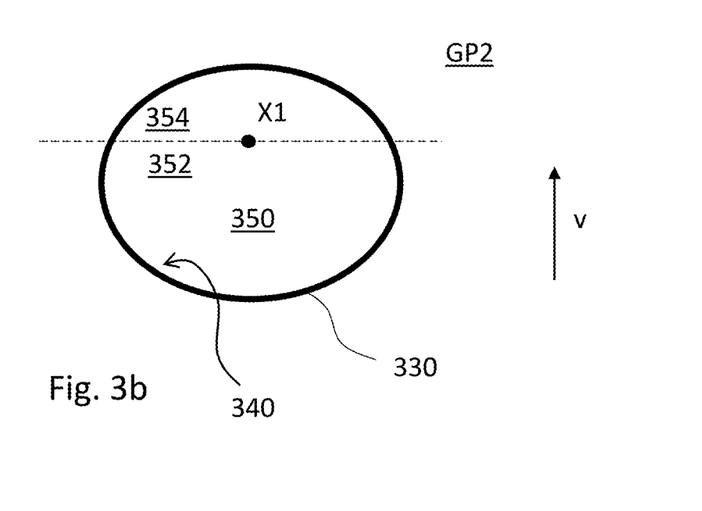

FIGS. 3a-b depict exemplary connecting interfaces 330 according to examples of the disclosure. The connecting interfaces 330 are in these examples shown in the second geometric sectional plane GP2. The connecting interfaces 330 as shown in FIGS. 3a-b may be the connecting interface 330 as shown in FIG. 2. The second geometric sectional plane GP2 may extend in the vertical direction v of the powertrain 100, and the inner perimeter profile 340 may enclose an area 350, as seen in the second geometric sectional plane GP2. In addition, the eccentricity may be formed such that a first portion 352 of the area 350, which in the vertical direction v is below the first rotational axis X1, is larger than a second portion 354 of the area 350, which in the vertical direction v is above the first rotational axis X1. Thereby, lubricant, such as oil, may be more easily allowed to flow between the first and second transmission housings 310, 320, thus mitigating the risk of lubricant getting stuck in the first lubricant compartment 300.

The powertrain 100 may as mentioned in the above extend in a vertical direction v which is perpendicular to the first rotational axis X1. With reference to FIG. 2, the first set of gearwheels T1 may have a lowest point T12 in the vertical direction v, and the inner perimeter profile 340 of the connecting interface 330 may have a lowest point 342 in the vertical direction v. As depicted, the first lubricant compartment 300 may comprise an inner bottom wall surface 312 which is formed such that the inner bottom wall surface 312 extends along an axis X3, wherein preferably the axis X3 is parallel with the first rotational axis X1, from a point 3121 below the lowest point T12 of the first set of gearwheels T1 to the lowest point 342 of the inner perimeter profile 340. Thereby, as shown, lubricant may be allowed to flow freely along the inner bottom wall surface 312 between the point 3121 and the connecting interface 330.

With reference to FIG. 3a, the inner perimeter profile 340 may be circular, i.e., as seen in the second geometric sectional plane GP2. Accordingly, the connecting interface 330 may comprise a circular sealing element (not shown), such as an O-ring, for sealing the connecting interface 330. This implies a reliable connecting interface 330, mitigating the risk of lubricant leakage. Alternatively, as depicted in FIG. 3b, the inner perimeter profile 330 may be oval, i.e. as seen in the second geometric sectional plane GP2. Accordingly, the connecting interface 330 may comprise an oval sealing element (not shown), such as an oval O-ring. Other shapes of the inner perimeter profile are of course feasible, such as a more square-like or rectangular-like shape.

Figure 4:
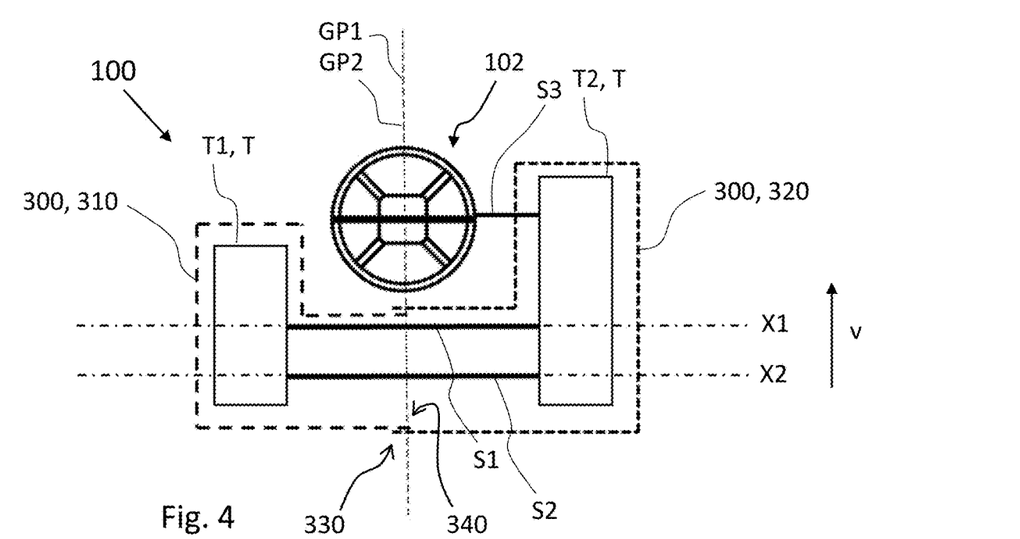
FIG. 4 is a schematic view of an exemplary powertrain according to an example of the disclosure.

With reference to e.g., FIG. 4, depicting an alternative example of a powertrain 100 according to the disclosure, at least one gearwheel of the first set of gearwheels T1 may further be drivingly connected to at least one gearwheel of the second set of gearwheels T2 via a second shaft S2 which is configured to rotate about a second rotational axis X2, and the second shaft S2 may extend through the connecting interface 330. The second rotational axis X2 may as shown be parallel with the first rotational axis X1, i.e., extending in the same direction and being offset from the first rotational axis X1. The inner perimeter profile 340 may be eccentric to each one of the first and second rotational axis X1, X2. The other elements and parts of the powertrain 100 depicted in FIG. 4 may correspond to the elements and parts as described with reference to FIG. 2.

Figure 5:
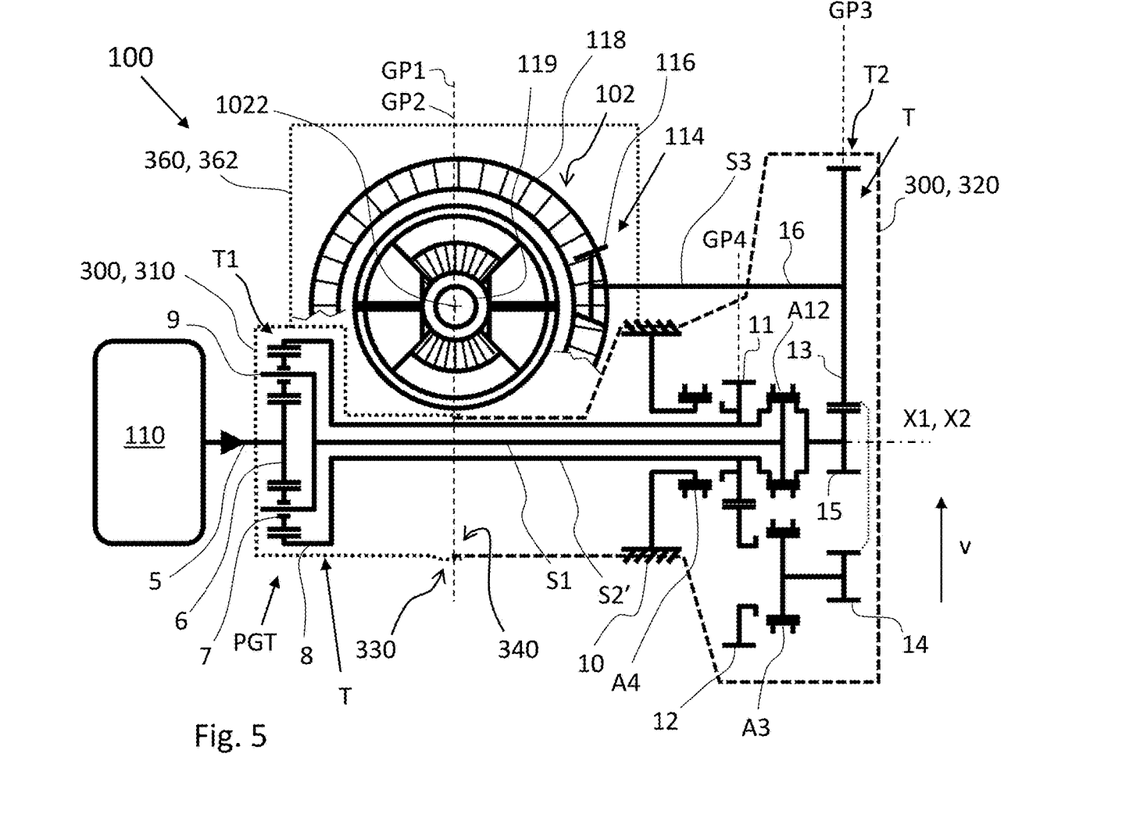
FIG. 5 is a schematic view of an exemplary powertrain according to an example of the disclosure.

FIG. 5 depicts a schematic view of another example of a powertrain 100 according to the present disclosure. The powertrain 100 in FIG. 5 may be similar to the powertrain 100 described with reference FIG. 2, and therefore some of the details already described with reference to FIG. 2 will not be described in further detail for this example. As shown, the first set of gearwheels T1 may be a planetary gearset PGT. The powertrain 100 as shown in FIG. 5 also comprises a second shaft S2' which is configured to rotate about a second rotational axis X2. The first set of gearwheels T1 is in this example configured to be drivingly connected to the second set of gearwheels T2 via the first shaft S1 and the second shaft S2'. Further, the second shaft S2' is concentric with the first shaft S1, i.e., the first and second rotational axes X1, X2 coincide.

As shown, the powertrain 100 may comprise a second lubricant compartment 360 for the differential gear 102. The second lubricant compartment 360 may be formed by a differential gear housing 362.

At least one of the first and second transmission housings 310, 320 may be a separate element with respect to the differential gear housing 362. Additionally, or alternatively, at least one of the first and second transmission housings 310, 320 may be part of the differential gear housing 362, such as made in one single piece of cast material, e.g., cast iron.

Similar to the above examples, the powertrain 100 may extend in a vertical direction v which is perpendicular to the first rotational axis X1. The connecting interface 330 may as shown in FIG. 5 be at least partly provided below a center point 1022 of the differential gear 102, as seen in the vertical direction v. In the shown example, the first and second geometric sectional planes GP1, GP2 intersect the center point 1022 of the differential gear 102.

As further shown in FIG. 5, the transmission T may further comprise an input shaft 5 drivingly connected to the first set of gearwheels T1, in this example to the planetary gearset PGT, and an output shaft 16 configured to drivingly connect the second set of gearwheels T2 to the differential gear 102. Accordingly, the output shaft 16 corresponds to the third shaft S3 as mentioned in the above.

The transmission T may be configured to selectively provide at least two different input/output speed ratios with respect to the input shaft 5 and the output shaft 16, and the transmission T may further be configured such that at least one of the at least two different input/output speed ratios is achieved by simultaneously providing two separate torque paths from the input shaft 5 to the output shaft 16. An example of the separate torque paths will be described more in detail in the below.

The transmission T may as shown in FIG. 5 further comprises at least one gear engaging device A12, A3, A4 which is configured to provide at least two selectable gear connections. The at least one gear engaging device A12, A3, A4 may as shown be located in the second transmission housing 320. In the shown example, there are three gear engaging devices A12, A3, A4.

As shown in the example in FIG. 5, the powertrain 100 may further comprise a final drive gearset 114 drivingly connecting the output shaft 16 to the differential gear 102. The final drive gearset 114 may as depicted be a bevel gearset. For example, the bevel gearset 114 may be a hypoid bevel gearset. In an alternative example not shown, the final drive gearset may comprise at least a first and second drivingly connected cylindrical gearwheels.

The final drive gearset 114 may as shown comprise a final drive first gearwheel 116 which is drivingly connected to the differential gear 102. The final drive gearset 114 may comprise a final drive second gearwheel 118. In this example, the final drive first gearwheel 116 is rotationally fixed to the output shaft 16. The final drive first gearwheel 116 may be in meshing engagement with the final drive second gearwheel 118.

The planetary gearset PGT comprises a sun gearwheel 6, one or more planet gearwheels 7, a planet gearwheel carrier 9 and a planet ring gearwheel 8. The input shaft 5 is drivingly connected to the sun gearwheel 6, in this example the input shaft 5 is rotationally fixed to the sun gearwheel 6.

The second set of gearwheels T2 may as shown in FIG. 5 comprise a first gearwheel 11, a second gearwheel 12, a third gearwheel 13, a fourth gearwheel 14 and a fifth gearwheel 15.

The first gearwheel 11 is in driving connection with the second gearwheel 12, each one of the third and fourth gearwheels 13, 14 is in driving connection with the fifth gearwheel 15, and one of the third, fourth or fifth gearwheels 13, 14, 15 is rotatably connectable or connected to the output shaft 16. The driving connection between the fourth and the fifth gearwheels 14, 15 is indicated by a broken line therebetween.

In this example, the first gearwheel 11 is in meshing engagement with the second gearwheel 12, and each one of the third and fourth gearwheels 13, 14 is in meshing engagement with the fifth gearwheel 15. However, in other examples, the driving connection may be enabled by use of at least one intermediate gearwheel in-between any two of the drivingly connected gearwheels. Furthermore, as shown in this example, the third gearwheel 13 may be rotationally fixed to the output shaft 16. Still further, as shown, the third gearwheel 13 may be the gearwheel with the largest diameter out of the gearwheels 13, 14 and 15. As further shown in this example, a rotational axis of the fifth gearwheel 15 may coincide with the first rotational axis X1 and/or the second rotational axis X2.

At least two of the gear engaging device A12, A3, A4, may be configured to provide at least four selectable gear connections, comprising:
  a first selectable gear connection in which the planetary gearset PGT is internally locked;
  a second selectable gear connection in which the planet gearwheel carrier 9 is rotatably connected to the third gearwheel 13;

a third selectable gear connection in which the planet ring gearwheel 8 is drivingly connected to the fourth gearwheel 14; and a fourth selectable gear connection in which the planet ring gearwheel 8 is rotatably locked to a fixed member 10.

The fixed member 10 may for example be a transmission housing member, e.g., the second transmission housing 320.

The planet ring gearwheel 8 is in the shown example rotatably connected to the first gearwheel 11, i.e. via the second shaft S2'. Furthermore, a first gear engaging device A3 is configured to be provided in a first gear engaging device first state where the first gear engaging device A3 rotationally connects the second gearwheel 12 to the fourth gearwheel 14 and in a first gear engaging device second state where the first gear engaging device A3 rotationally disconnects the second gearwheel 12 from the fourth gearwheel 14, wherein the third selectable gear connection is provided by at least setting the first gear engaging device A3 in the first gear engaging device first state.

A second gear engaging device A12 may be configured to provide the first selectable gear connection and the second selectable gear connection. The first selectable gear connection is in the shown example provided by rotatably connecting the planet gearwheel carrier 9 to the planet ring gearwheel 8, thereby internally locking the planetary gearset PGT.

As further shown in the example in FIG. 5, a third gear engaging device A4 is provided which is configured to provide the fourth selectable gear connection. More specifically, in the shown example, the transmission T is configured to provide the fourth selectable gear connection by directly locking the planet ring gearwheel 8 to the fixed member 10.

As further shown in FIG. 5, the third, fourth and fifth gearwheels 13, 14, 15 may be arranged so that they are provided in a first common gear plane GP3 of the transmission T which is perpendicular to rotational axes of the third, fourth and fifth gearwheels 13, 14, 15. As mentioned in the above, the rotational axis of the fifth gearwheel 15 corresponds to the rotational axes X1, X2 in this example. The rotational axes of the third and fourth gearwheels 13, 14 may as shown be parallel with the rotational axes X1, X2. Still further, as shown in FIG. 5, the first and second gearwheels 11, 12 may be arranged so that they are provided in a second common gear plane GP4 of the transmission T which is perpendicular to rotational axes of the first and second gearwheels 11, 12. In the shown example, the rotational axis of the first gearwheel 11 corresponds to the first rotational axis X1 and the second rotational axis X2. The rotational axis of the second gearwheel 12 is in this example parallel with the first and second rotational axes X1, X2. As may be gleaned from FIG. 5, a common gear plane for a number of gearwheels may mean that the common gear plane intersects cogs of each gearwheel of the number of gearwheels.

The differential gear 102 may be configured to provide a driving torque to a respective half-shaft (not shown) of a drive axle 119 for driving the vehicle 200. The driving wheels 220 may be mounted on each half shaft. In some examples, a gearing (not shown) may be provided between the respective half-shaft and the respective driving wheel 220. For example, the gearing may be any one of a hub reduction or a portal axle gearset. It shall be understood that not only wheels may be used but e.g., crawler members may additionally or alternatively, be used.

The input shaft 5 may as shown be configured to be connected to a power unit 110. According to one example, the power unit 110 forms part of the powertrain 100. The power unit 110 is typically an electric motor for driving the drive axle 119. The electric motor may also be used as a generator for e.g. charging an electric energy storage system (not shown), such as a high-voltage battery.

The gear engaging devices A12, A3, A4 may for example be sleeve-formed members which are connected to respective shift forks (not shown). The shift forks are preferably connected to actuators (not shown) which in turn are preferably controlled by a transmission control unit (not shown). The at least four selectable gear connections may be provided by two to four gear engaging devices.

The transmission T may be set to a power split gear state in which first and second separate torque paths between the input shaft 5 and the output shaft 16 are achieved. The first torque path extends between the input shaft 5 and the output shaft 16 via the planet ring gearwheel 8, the first gearwheel 11, the second gearwheel 12, the fourth gearwheel 14 and the third gearwheel 13. The second torque path extends between the input shaft 5 and the output shaft 16 via the planet gearwheel carrier 9, the fifth gearwheel 15 and the third gearwheel 13. The power split gear state is set by providing the second and third selectable gear connections. Accordingly, this may be set by use of the gear engaging devices A12 and A3 as described in the above. The power split gear state is preferably automatically set by use of the above-mentioned transmission control unit and associated actuators in response to a request to set the power split gear state.

For example, the power split gear state may refer to a "1st gear" of the transmission T.

Figure 6:
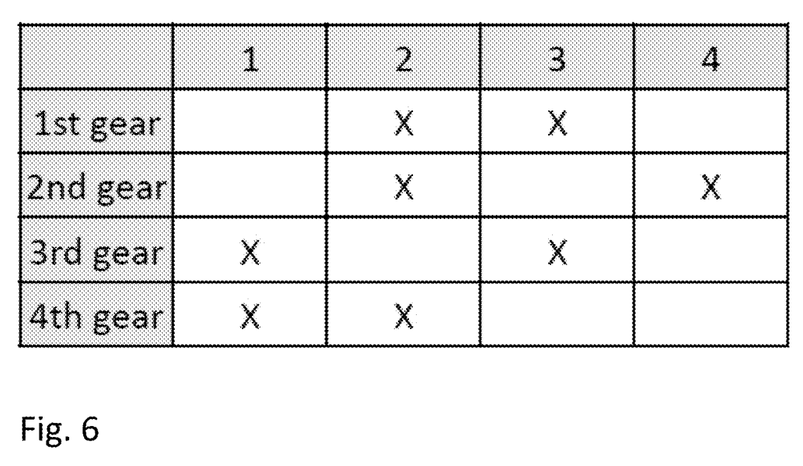
FIG. 6 is a table with a 1st to a 4th gear according to an example of the present disclosure.

The transmission T may for example have four different input/output speed ratios, or "gears". FIG. 6 depicts a table with four different input/output speed ratios, i.e. a 1st gear, a 2nd gear, a 3rd gear and a 4th gear. The 1st to 4th gears are provided by the above mentioned four selectable gear connections. The selectable gear connections are in FIG. 6 depicted on the uppermost row, wherein the first selectable gear connection is denoted 1, the second selectable gear connection is denoted 2, the third selectable gear connection is denoted 3 and the fourth selectable gear connection is denoted 4.

Accordingly, the 1st gear may refer to the power split mode. The 2nd gear may be provided by selecting the second selectable gear connection and the fourth selectable gear connection. The 3rd gear may be provided by selecting the first and the third selectable gear connections. The 4th gear may be provided by selecting the first and the second selectable gear connection.

Each gear engaging device may be settable to two or three different positions, by e.g., moving each gear engaging device along a direction corresponding to the direction of the first and second rotational axes X1, X2. In the example shown in FIG. 5, the gear engaging devices A3 and A4 are settable to two different positions and the gear engaging device A12 is settable to three different positions.

Each one of the 1st to 4th gears are preferably automatically set by use of the above-mentioned transmission control unit and associated actuators in response to a request to set the respective input/output speed ratio of the 1st to 4th gears.

In the below, possible features and feature combinations of the disclosure are presented as a list of examples.

Example 1: A powertrain (100) for a vehicle (200), comprising:

a transmission (T) and a differential gear (102) which are drivingly connected to each other, wherein the differential gear (102) is configured to be drivingly connected to driving wheels (120) of the vehicle (200);

wherein the transmission (T) comprises a first set of gearwheels (T1) and a second set of gearwheels (T2), at least one gearwheel of the first set of gearwheels (T1) being drivingly connected to at least one gearwheel of the second set of gearwheels (T2) via at least a first shaft (S1) which is configured to rotate about a first rotational axis (X1), wherein the first set of gearwheels (T1) is arranged on a first side of the differential gear (102) and the second set of gearwheels (T2) is arranged on a second opposite side of the differential gear (102), as seen with respect to a first geometric sectional plane (GP1), which is perpendicular to the first rotational axis (X1) and which extends through the differential gear (102), wherein the transmission (T) further comprises a first lubricant compartment (300) for the first and second set of gearwheels (T1, T2), the first lubricant compartment (300) being formed by a first transmission housing (310) for the first set of gearwheels (T1) and a second transmission housing (320) for the second set of gearwheels (T2), the first and second transmission housings (310, 320) being fluidly connected by a connecting interface (330), wherein the at least first shaft (S1) extends through the connecting interface (330) and wherein the connecting interface (330) defines an inner perimeter profile (340) of the first lubricant compartment (300) which encloses the at least first shaft (S1), and wherein the inner perimeter profile (340) is eccentric with respect to the first rotational axis (X1), as seen in a second geometric sectional plane (GP2) which extends through the connecting interface (330) and which is perpendicular to the first rotational axis (X1).

Example 2: The powertrain (100) according to Example 1, wherein the second geometric sectional plane (GP2) extends in a vertical direction (v) of the powertrain (100), and wherein the inner perimeter profile (340) encloses an area (350), as seen in the second geometric sectional plane (GP2), wherein
the eccentricity is formed such that a first portion (352) of the area (350), which in the vertical direction (v) is below the first rotational axis (X1), is larger than a second portion (354) of the area (350), which in the vertical direction (v) is above the first rotational axis (X1).

Example 3: The powertrain (100) according to any one of Examples 1 or 2, wherein the powertrain (100) extends in a vertical direction (v) which is perpendicular to the first rotational axis (X1), wherein the first set of gearwheels (T1) is having a lowest point (T12) in the vertical direction (v), and wherein the inner perimeter profile (340) of the connecting interface (330) is having a lowest point (342) in the vertical direction (v), wherein the first lubricant compartment (300) comprises an inner bottom wall surface (312) which is formed such that the inner bottom wall surface (312) extends along an axis (X3), preferably wherein the axis (X3) is parallel with the first rotational axis (X1), from a point (3121) below the lowest point (T12) of the first set of gearwheels (T1) to the lowest point (342) of the inner perimeter profile (340).

Example 4: The powertrain (100) according to any one of the Examples 1-3, wherein the inner perimeter profile (340) is circular or oval, as seen in the second geometric sectional plane (GP2).

Example 5: The powertrain (100) according to any one of the Examples 1-4, wherein the first set of gearwheels (T1) is a planetary gearset (PGT).

Example 6: The powertrain (100) according to any one of the Examples 1-5, wherein at least one gearwheel of the first set of gearwheels (T1) is further drivingly connected to at least one gearwheel of the second set of gearwheels (T2) via a second shaft (S2, S2') which is configured to rotate about a second rotational axis (X2), and wherein the second shaft (S2, S2') extends through the connecting interface (330).

Example 7: The powertrain (100) according to Example 6, wherein the second shaft (S2') is concentric with the first shaft (S1).

Example 8: The powertrain (100) according to Example 6, wherein the second rotational axis (X2) is parallel with the first rotational axis (X1).

Example 9: The powertrain (100) according to any one of the Examples 1-8, further comprising a second lubricant compartment (360) for the differential gear (102), the second lubricant compartment being formed by a differential gear housing (362).

Example 10: The powertrain (100) according to Example 9, wherein at least one of the first and second transmission housings (310, 320) is a separate element with respect to the differential gear housing (362).

Example 11: The powertrain (100) according to any one of Examples 9 or 10, wherein at least one of the first and second transmission housings (310, 320) is part of the differential gear housing ( ), such as made in one single piece of cast material.

Example 12: The powertrain (100) according to any one of the Examples 1-11, wherein the powertrain (100) extends in a vertical direction (v) which is perpendicular to the first rotational axis (X1), and wherein the connecting interface (330) is at least partly provided below a center point (1022) of the differential gear (102), as seen in the vertical direction (v).

Example 13: The powertrain (100) according to any one of the Examples 1-12, wherein the transmission (T) further comprises an input shaft (5) drivingly connected to at least one gearwheel of the first set of gearwheels (T1) and an output shaft (16) configured to drivingly connect at least one gearwheel of the second set of gearwheels (T2) to the differential gear (102), wherein the transmission (T) is configured to selectively provide at least two different input/output speed ratios with respect to the input shaft (5) and the output shaft (16), and wherein the transmission (T) is further configured such that at least one of the at least two different input/output speed ratios is achieved by simultaneously providing two separate torque paths from the input shaft (5) to the output shaft (16).

Example 14: The powertrain (100) according to any one of the Examples 1-13, wherein the transmission (T) further comprises at least one gear engaging device (A12, A3, A4) which is configured to provide at least two selectable gear connections, wherein the at least one gear engaging device (A12, A3, A4) is located in the second transmission housing (320).

Example 15: The powertrain (100) according to any one of the Examples 1-14, wherein the connecting interface comprises a sealing element for sealing the connecting interface, such as a ring-formed sealing element, for example made of a polymer, such as rubber.

Example 16: The powertrain (100) according to any one of the Examples 1-15, further comprising at least one power unit (110) configured to provide propulsion power to the driving wheels (220) of the vehicle (200), wherein the at least one power unit is configured to be drivingly connected to an input shaft (5) of the transmission (T), preferably an input shaft (5) of the first set of gearwheels.

Example 17: The powertrain (100) according to Example 16, wherein the at least one power unit (110) is an electric motor.

Example 18: The powertrain (100) according to any one of the Examples 1-17, wherein the second set of gearwheels (T2) is drivingly connected to the differential gear (102) via a third shaft (S3).

Example 19: The powertrain (100) according to any one of the Examples 1-18, wherein the powertrain (100) further comprises a final drive gearset (114) drivingly connecting an output shaft (16) of the second set of gearwheels (T2) to the differential gear (102).

Example 20: A vehicle (200) comprising the powertrain (100) according to any one of the Examples 1-19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

By the terms "rotationally connected" and "rotationally connects" is intended "connected for common rotation with". For example, in the first gear engaging device first state, the first gear engaging device connects the second gearwheel for common rotation with the fourth gearwheel around a common axis of rotation.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A powertrain for a vehicle, comprising:
    a transmission and a differential gear which are drivingly connected to each other, wherein the differential gear is configured to be drivingly connected to driving wheels of the vehicle;
    wherein the transmission comprises a first set of gearwheels and a second set of gearwheels, at least one gearwheel of the first set of gearwheels being drivingly connected to at least one gearwheel of the second set of gearwheels via at least a first shaft which is configured to rotate about a first rotational axis,
    wherein the first set of gearwheels is arranged on a first side of the differential gear and the second set of gearwheels is arranged on a second opposite side of the differential gear, as seen with respect to a first geometric sectional plane, which is perpendicular to the first rotational axis and which extends through the differential gear,
    wherein the transmission further comprises a first lubricant compartment for the first and second set of gearwheels, the first lubricant compartment being formed by a first transmission housing for the first set of gearwheels and a second transmission housing for the second set of gearwheels, the first and second transmission housings being fluidly connected by a connecting interface,
    wherein the at least first shaft extends through the connecting interface and wherein the connecting interface defines an inner perimeter profile of the first lubricant compartment which encloses the at least first shaft,
    wherein the inner perimeter profile is eccentric with respect to the first rotational axis, as seen in a second geometric sectional plane which extends through the connecting interface and which is perpendicular to the first rotational axis, and
    wherein the transmission further comprises at least one gear engaging device which is configured to provide at least two selectable gear connections, wherein the at least one gear engaging device is located in the second transmission housing.

2. The powertrain according to claim 1, wherein the second geometric sectional plane extends in a vertical direction of the powertrain, and wherein the inner perimeter profile encloses an area, as seen in the second geometric sectional plane,
wherein
the eccentricity is formed such that a first portion of the area, which in the vertical direction is below the first rotational axis, is larger than a second portion of the area, which in the vertical direction is above the first rotational axis.

3. The powertrain according to claim 1, wherein the powertrain extends in a vertical direction which is perpendicular to the first rotational axis, wherein the first set of gearwheels is having a lowest point in the vertical direction, and wherein the inner perimeter profile of the connecting interface is having a lowest point in the vertical direction,
wherein
the first lubricant compartment comprises an inner bottom wall surface which is formed such that the inner bottom wall surface extends along an axis, preferably wherein the axis is parallel with the first rotational axis, from a point below the lowest point of the first set of gearwheels to the lowest point of the inner perimeter profile.

4. The powertrain according to claim 1, wherein the inner perimeter profile is circular or oval, as seen in the second geometric sectional plane.

5. The powertrain according to claim 1, wherein the first set of gearwheels is a planetary gearset.

6. The powertrain according to claim 1, wherein the at least one gearwheel of the first set of gearwheels is further drivingly connected to the at least one gearwheel of the second set of gearwheels via a second shaft which is configured to rotate about a second rotational axis, and wherein the second shaft extends through the connecting interface.

7. The powertrain according to claim 6, wherein the second shaft is concentric with the first shaft.

8. The powertrain according to claim 6, wherein the second rotational axis is parallel with the first rotational axis.

9. The powertrain according to claim 1, further comprising a second lubricant compartment for the differential gear, the second lubricant compartment being formed by a differential gear housing.

10. The powertrain according to claim 9, wherein at least one of the first and second transmission housings is a separate element with respect to the differential gear housing.

11. The powertrain according to claim 9, wherein at least one of the first and second transmission housings is part of the differential gear housing made in one single piece of cast material.

12. The powertrain according to claim 1, wherein the powertrain extends in a vertical direction which is perpendicular to the first rotational axis, and wherein the connecting interface is at least partly provided below a center point of the differential gear, as seen in the vertical direction.

13. A vehicle comprising the powertrain according to claim 1.

14. The powertrain according to claim 2, wherein the powertrain extends in a vertical direction which is perpendicular to the first rotational axis, wherein the first set of gearwheels is having a lowest point in the vertical direction, and wherein the inner perimeter profile of the connecting interface is having a lowest point in the vertical direction,
wherein
the first lubricant compartment comprises an inner bottom wall surface which is formed such that the inner bottom wall surface extends along an axis, preferably wherein the axis is parallel with the first rotational axis, from a point below the lowest point of the first set of gearwheels to the lowest point of the inner perimeter profile.

15. The powertrain according to claim 10, wherein at least one of the first and second transmission housings is part of the differential gear housing made in one single piece of cast material.

16. A powertrain for a vehicle, comprising:
a transmission and a differential gear which are drivingly connected to each other, wherein the differential gear is configured to be drivingly connected to driving wheels of the vehicle;
wherein the transmission comprises a first set of gearwheels and a second set of gearwheels, at least one gearwheel of the first set of gearwheels being drivingly connected to at least one gearwheel of the second set of gearwheels via at least a first shaft which is configured to rotate about a first rotational axis,
wherein the first set of gearwheels is arranged on a first side of the differential gear and the second set of gearwheels is arranged on a second opposite side of the differential gear, as seen with respect to a first geometric sectional plane, which is perpendicular to the first rotational axis and which extends through the differential gear,
wherein the transmission further comprises a first lubricant compartment for the first and second set of gearwheels, the first lubricant compartment being formed by a first transmission housing for the first set of gearwheels and a second transmission housing for the second set of gearwheels, the first and second transmission housings being fluidly connected by a connecting interface,
wherein the at least first shaft extends through the connecting interface and wherein the connecting interface defines an inner perimeter profile of the first lubricant compartment which encloses the at least first shaft,
wherein the inner perimeter profile is eccentric with respect to the first rotational axis, as seen in a second geometric sectional plane which extends through the connecting interface and which is perpendicular to the first rotational axis, and
wherein the transmission further comprises an input shaft drivingly connected to at least one gearwheel of the first set of gearwheels and an output shaft configured to drivingly connect at least one gearwheel of the second set of gearwheels to the differential gear, wherein the transmission is configured to selectively provide at least two different input/output speed ratios with respect to the input shaft and the output shaft, and wherein the transmission is further configured such that at least one of the at least two different input/output speed ratios is achieved by simultaneously providing two separate torque paths from the input shaft to the output shaft.

* * * * *